(12) United States Patent
Starz et al.

(10) Patent No.: US 6,500,217 B1
(45) Date of Patent: Dec. 31, 2002

(54) PROCESS FOR APPLYING ELECTRODE LAYERS TO A POLYMER ELECTROLYTE MEMBRANE STRIP FOR FUEL CELLS

(75) Inventors: Karl-Anton Starz, Rodenbach (DE); Ralf Zuber, Grossostheim (DE); Wolfgang Göttenauer, Bruchköbel (DE); Knut Fehl, Schlüchtern (DE); Manfred Diehl, Frankfurt (DE)

(73) Assignee: Degussa-Huls Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/340,197

(22) Filed: Jun. 28, 1999

(30) Foreign Application Priority Data

Mar. 11, 1999 (DE) .......................... 199 10 773

(51) Int. Cl.$^7$ ................................ H01N 4/04
(52) U.S. Cl. ........................ 29/623.5; 429/124
(58) Field of Search ............... 29/623.5, 623.1; 429/40, 41, 42, 127, 162, 124

(56) References Cited

U.S. PATENT DOCUMENTS

| | | | | |
|---|---|---|---|---|
| 4,047,289 A | * | 9/1977 | Wolff .................. | 29/623.4 |
| 5,211,984 A | | 5/1993 | Wilson ................. | 427/115 |
| 5,761,793 A | | 6/1998 | Bevers et al. ......... | 29/623.5 |
| 5,861,222 A | | 1/1999 | Fischer ................ | 429/42 |
| 6,074,692 A | * | 6/2000 | Hulett ................. | 429/115 |

FOREIGN PATENT DOCUMENTS

| | | |
|---|---|---|
| DE | 19509748 | 10/1996 |
| DE | 19611510 | 9/1997 |
| EP | 0731520 | 9/1996 |
| WO | 97/23916 | 7/1997 |

OTHER PUBLICATIONS

Patent Abstracts of Japan, vol. 098, No. 008, Jun. 30, 1998, JP 10 064574 (Mar. 6, 1998).
Derwent publications Ltd. AN 98–222669, XP002110924, Mar. 6, 1998.
CA 128:104377/WPI 1998–077409.
CA 127:1381026/WPI 1997–351291.

* cited by examiner

*Primary Examiner*—Gabrielle Brouillette
*Assistant Examiner*—M. Wills
(74) *Attorney, Agent, or Firm*—Kalow & Springut LLP

(57) ABSTRACT

A process is disclosed for applying electrode layers to a polymer electrolyte membrane strip in a desired pattern, wherein the front and back of the membrane are continuously printed with the electrode layers in the desired pattern using an ink containing an electrocatalyst, and the printed electrode layers are dried at elevated temperature immediately after the printing operation, the printing taking place while maintaining accurate positioning of the patterns of the electrode layers on the front and back in relation to one another.

13 Claims, 4 Drawing Sheets

PROCESS FOR APPLYING ELECTRODE LAYERS TO A POLYMER ELECTROLYTE MEMBRANE STRIP FOR FUEL CELLS

INTRODUCTION AND BACKGROUND

The present invention relates to a process for applying electrode layers to a polymer electrolyte membrane strip in a desired pattern.

Fuel cells convert a fuel and an oxidizing agent, physically separated from one another, into electricity, heat and water at two electrodes. Hydrogen or a hydrogen-rich gas can be used as the fuel and oxygen or air as the oxidizing agent. The energy conversion process in the fuel cell is distinguished by particularly high efficiency. For this reason, fuel cells in combination with electric motors are gaining increasing importance as an alternative to conventional combustion engines for automotive vehicles.

The so-called polymer electrolyte membrane fuel cell (PEMFC) is suitable for use as an energy converter in motor vehicles thanks to its compact construction, its power density and its high efficiency.

The central component in a PEMFC is the so-called membrane-electrode assembly (MEA). This consists of a polymer electrolyte membrane which is provided on both sides with a catalytically active layer. One of the layers takes the form of an anode for the oxidation of hydrogen and the second layer takes the form of a cathode for the reduction of oxygen. In order to bring the gaseous reaction media (hydrogen and air) to the catalytically active layers and, at the same time, to establish an electrical contact, so-called gas diffusers or gas diffusion structures are placed on the anode and cathode layers. These are usually carbon fiber paper or nonwoven carbon fabric which allow the reaction gases good access to the electrodes and permit good discharge of the cell current. Single PEMFCs or PEMFC stacks are built up from these membrane-electrode assemblies.

The polymer electrolyte membrane consists of proton conducting polymer materials. These materials are also referred to below as ionomers for short. Tetrafluoroethylene-flourovinyl ether copolymer with sulfonic acid groups is preferably used. This material is marketed for example by E. I. du Pont with the trade name NAFION®. However, other, especially flourine-free, ionomer materials such as sulfonated polyether ketones or aryl ketones or polybenzimidazoles may also be used. For use in fuel cells, these membranes generally have a thickness of between 10 and 200 um.

The anode and cathode contain so-called electrocatalysts, which catalytically support the respective reaction (oxidation of hydrogen or reduction of oxygen). The metals of the platinum group of the periodic table are preferably used as the catalytically active components. For the most part, so-called supported catalysts are used, in which the catalytically active platinum group metals have been applied, in fine-particle form, to the surface of a conductive support material. The average crystallite size of the platinum group metal is between about 1 and 10 nm. Fine particle-size carbon blacks have proved suitable as support materials.

Many different processes exist for the production of membrane-electrode assemblies, but only a few of them are suitable for industrial purposes, i.e. for continuous manufacture on a large scale at economic costs.

In DE 195 09 749 (corresponding to U.S. Pat. No. 5,761,793) a process for the continuous production of a composite of electrode material, catalyst material and a solid electrolyte membrane is described, wherein a catalytic layer of a catalytic powder comprising the electrode material, the catalyst material and the solid electrolyte material is produced on a support. This catalytic layer is heated on a side facing away from the support to soften the solid electrolyte material and is applied on to the solid electrolyte membrane by rolling under pressure. The entire disclosure of U.S. Pat. No. 5,761,793 is incorporated herein by reference.

The polymer electrolyte membrane is coated over this entire surface using this process. The application of the electrodes in a two-dimensional pattern, also referred to below as selective coating, as is absolutely essential for the production of fuel cell stacks, can only be achieved with great effort. For this purpose, appropriately shaped separators which prevent the catalyst material from being bonded to the polymer electrolyte membrane are placed on the membrane. The areas of the support overlapping the separators can then be removed with a knife after the support has been applied on to the membrane by rolling.

In addition, this process is associated with a high risk of pinhole formation in the membrane, since the material for the electrode layers is used in powder form. If coarser powder particles are present in the catalytic material, the thermally softened membrane is perforated when the powder is rolled under high pressure.

In WO 97/50142 (CA 128: 104377 F/WPI 1998-077409) a continuous process for coating a polymer electrolyte membrane with electrodes is described, in which a polymer membrane strip is drawn through a bath of platinum salt solution. The adhering salt is then reduced to the precious metal in a gas stream or in another bath. With this process again, it is only possible to coat the polymer electrolyte membrane over its entire surface. The membrane can be damaged by the strongly acidic metal salt solutions and the reducing bath.

Another process is described in DE 195 48 421 (CA 127: 138102 G/WPI 1997-351291) for the production of a membrane-electrode assembly wherein the bonding of the polymer electrolyte membrane, the electrode layers and the gas diffusion layer is carried out continuously in a rolling process. The polymer membrane is coated with the electrode layers over its entire surface in this process.

Accordingly, it is an object of the present invention to provide a continuous and inexpensive process for coating a polymer electrolyte membrane strip with electrode layers in a desired pattern, which also allows the required pattern to be produced simply and with high dimensional stability. In addition, the risk of pinhole formation in the membrane by the coating process should largely be avoided.

SUMMARY OF THE INVENTION

The above and other objects of the invention can be achieved by a process for applying electrode layers on to a polymer electrolyte membrane strip in a desired pattern, wherein the front and back of the membrane are continuously printed with the electrode layers in the desired pattern using an ink containing an electrocatalyst and the printed electrode layers are dried at elevated temperature immediately after the printing operation, the printing taking place while maintaining accurate positioning of the patterns of the electrode layers on the front and back in relation to one another.

For use in the process according to the invention the starting material is a polymer electrolyte membrane strip supplied, for example, in a roll. The process is carried out on a strip-coating line with various stations. This line is equipped with a minimum of an unwinding device, a printing station, a drying station and a winding device, and several deflector and guide rolls as required.

The strip speed can vary within relatively broad limits and its upper limit is set only by the constraints of the printing process selected. After leaving the printing station, the polymer strip with the still fresh electrode layers passes through the drying station. The electrode layers are therefore dried at elevated temperature immediately after the printing operation. A continuous circulating air drier may be used as the drying station, for example. Infrared driers are also suitable. The preferred temperatures for drying the layers are between 60 and 150° C. The residence time of the polymer membrane in the drying station must guarantee adequate drying of the electrode layers. It depends on the temperature selected and can be prolonged by appropriate deflections in the drying station.

The printing process takes place with an ink which contains an electrocatalyst. This ink is often also referred to as a paste because of its consistency. In addition to a high boiling-point solvent it contains, for example, one or more electrocatalysts, proton-conducting ionomer and optionally auxiliaries such as wetting agents, pore forming agents or similar. To produce these inks, the components are processed to an intimate mixture with the aid of high shear forces. This guarantees good dispersion of the electrocatalyst in the solvent. Inks and pastes suitable for the process according to the invention are described in DE 19611510 A1 (U.S. Pat. No. 5,861,222), P 19810485.5 (as yet unpublished German patent application) and P 19837669.3 (as yet unpublished German patent application).

Various printing processes may be used for printing the membrane, such as for example screen printing, offset, gravure or pad printing. Depending on the printing process used and the desired layer thickness of the electrode layers, the consistency of the ink must be adjusted accordingly, in order to obtain optimum results. The necessary measures are known to the expert. The layer thicknesses for the electrodes are in the range of between 5 and 100, preferably between 5 and 15 um. If the necessary layer thickness is not achieved with one printing operation, the membrane may be printed more than once.

BRIEF DESCRIPTION OF DRAWINGS

The process according to the invention is explained in more detail with reference to the following figures, wherein.

DETAILED DESCRIPTION OF INVENTION

Figures 1, 2:
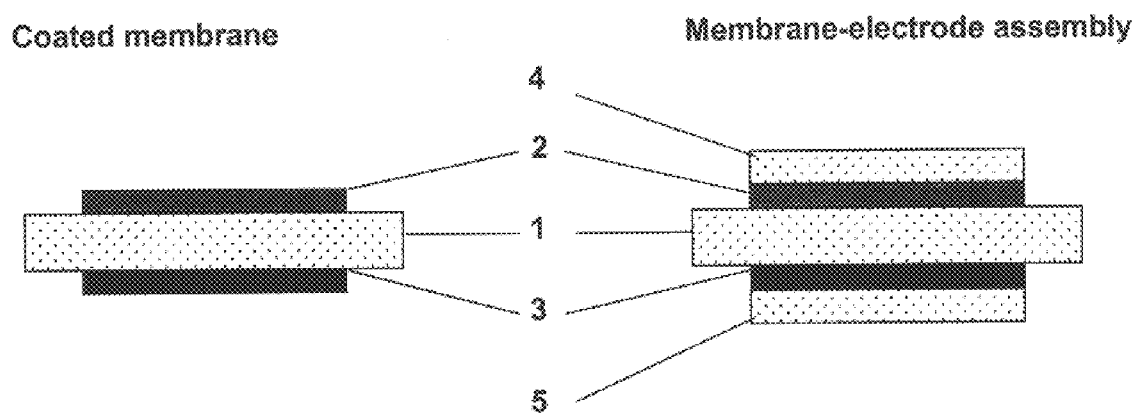
FIG. 1 is a schematic view of a polymer electrolyte membrane coated on both sides with electrode layers.
FIG. 2 is a schematic view of a membrane-electrode assembly.

The present invention will now be described in further detail.

Depending on the printing process used, the two sides of the polymer membrane may be printed simultaneously or consecutively. For example, the gravure printing process is suitable for the simultaneous coating of the membrane with the electode layers while the two sides of the membrane are preferably coated consecutively by the screen printing process.

The consecutive coating of the front and back may be performed on a strip coating line with minimal equipment (one printing station and one drying station) in that the membrane is first coated only on one side. The roll of the polymer membrane is then removed from the winding device and inserted the other way round in the unwinding device in order to print the back of the membrane in a second pass. Alternatively, the strip coating line can be extended by adding a second printing station and a second drying station in order to coat the polymer membrane on both sides in a single pass.

In this case it must be ensured that the printed patterns of the electrode layers are positioned accurately in relation to one another on the front and back. The criterion of accurate positioning depends on the requirements of the subsequent assembly of the fuel cell stacks. Tolerances of ±0.25 mm for the overlap accuracy of front and back printing are generally permissible.

The measures to be taken to maintain the accurate positioning required are, on the one hand, related to printing industry technology and are therefore familiar to every printing expert. On the other hand, the accuracy of print positioning on front and back can be improved by additional measures. These include the use of the polymer electrolyte membrane in a thermally stable form, which can be obtained by exchanging the protons of the membrane with monovalent, positively charged ions such as, for example, potassium, sodium, ammonium or tetrabutylammonium ions. The increased thermal stability reduces the risk of damage to the membrane structure from the necessary drying processes and thus guarantees that good proton conductivity is maintained.

If the polymer membrane is present in an acid form, it can be converted to a thermally stable form on the strip coating line. For this purpose, an ion exchange bath is inserted into the strip coating line upstream of the printing station. The ion exchange bath contains dilute tetrabutylammonium hydroxide solution, potassium hydroxide solution, sodium hydroxide solution or an ammonia solution, as required. After leaving the exchange bath, any liquid still adhering is removed with suitable strippers.

To improve the accuracy of print positioning on front and back still further, the water content of the membrane can be kept within certain limits. Controlling the water contents of the membrane during the printing process enables the shrinkage and expansion properties of the membrane to be controlled and thus increases the accuracy of print positioning on front and back. The maximum water absorption capacity of a polymer electrolyte membrane based on perfluorinated sulfonic acid is a water content of abut 30 wt. %. For the process according to the invention, water contents of 2 to 20, especially 10 to 20 wt. %, have proved suitable.

Higher water contents lead to excessive expansion of the membrane associated with crack formation and reduced adhesion of the electrode layers.

To adjust the water content of the membrane, a soaking bath may be inserted into the strip coating line upstream of the printing station. The temperature of the soaking bath should be in a range of between 20 and 95° C. The pH of the soaking bath depends on the form of the polymer membrane. For the acid form, the soaking bath must have a pH in the range of 1 and 5. The ion-exchanged, thermally stable form is soaked with pH values of between 7 and 9. Alternatively, there is the possibility of adjusting the water content of the membrane by treating it in a humid atmosphere with 50 to 100% relative humidity and at 40 to 90° C.

If an acidic membrane is used which is only converted to the thermally stable form on the strip coating line, the adjustment of the membrane to a particular water content also takes place here at the same time.

For use in fuel cells, any polymer membranes which have been ion-exchanged must be converted back to the acid form. This usually takes place by treating the membrane in concentrated sulfuric acid. An appropriate bath may be integrated into the strip coating line. A considerable advantage of the process according to the invention compared with the process described in DE 195 09 749, in which electrode layers and gas diffusion structures are laminated on the polymer membrane in one operation, is displayed here, for example. This process relies on the use of the membrane in the acid, less thermally stable form, since great difficulties would be involved in reprotonating the membrane with sulfuric acid through the generally hydrophobic gas diffusion structures.

All known polymer membranes can be coated with electrode layers by the process according to the invention. A membrane of tetrafluoroethylene-fluorovinyl ether copolymer with sulfonic acid groups is preferably used.

FIG. 1 shows the structure of a polymer membrane coated on front and back in cross section. FIG. 2 shows the cross sectional representation of a membrane-electrode assembly. Reference number (1) denotes the polymer membrane in each case. Reference number (2) denotes the anode layer and (3) the cathode layer. The membrane-electrode assembly in FIG. 2 additionally exhibits gas diffusion structures (4) for the anode and (5) for the cathode applied on both sides.

Figure 3:
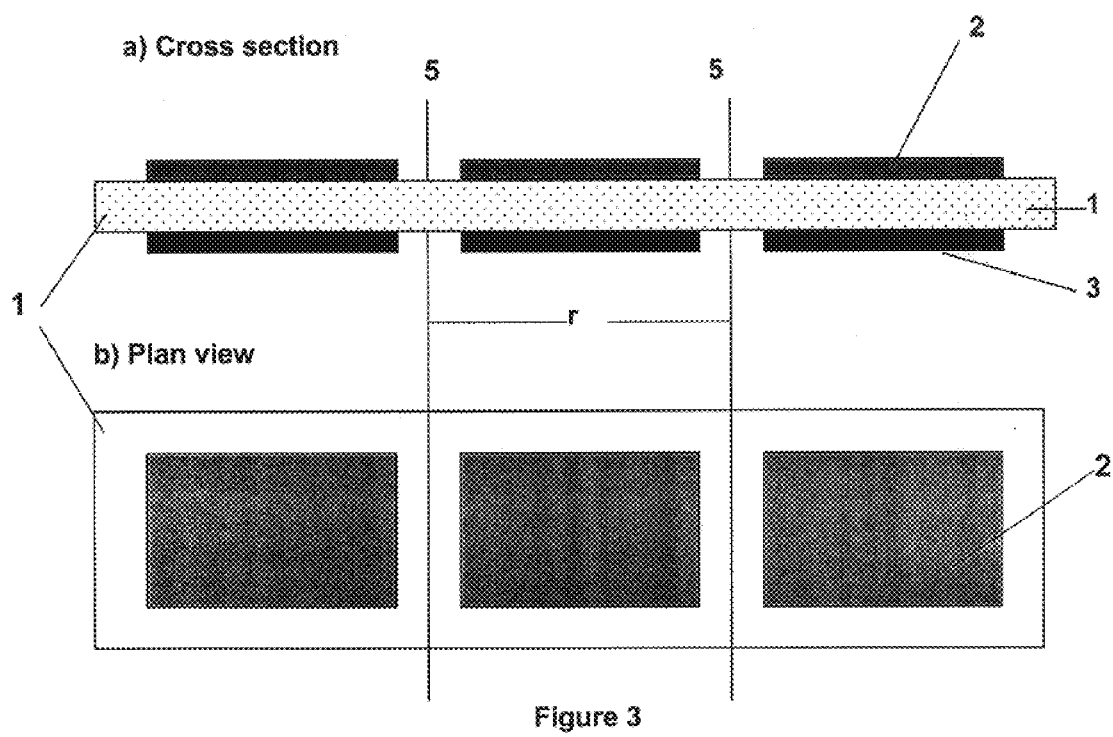
FIG. 3A is a schematic representation of a cross section of a polymer membrane printed with electrode layers on front and back.
FIG. 3B is a schematic representation of a plan view of a polymer membrane printed with electrode layer on front and back.

FIG. 3 shows the arrangement of the printed electrode layers (2) and (3) on the polymer membrane (1). Owing to their size in comparison with the width of the polymer membrane, the electrodes in FIG. 3 are only arranged in a linear pattern, with a repeat distance of r. With smaller electrodes or larger widths of the polymer membrane, the electrodes may of course also be printed on the membrane in a two-dimensional pattern. Once the front and back of the membrane have been printed with the electrodes, the membrane-electrode assemblies are separated by cutting along the cutting lines (5).

Figure 4:
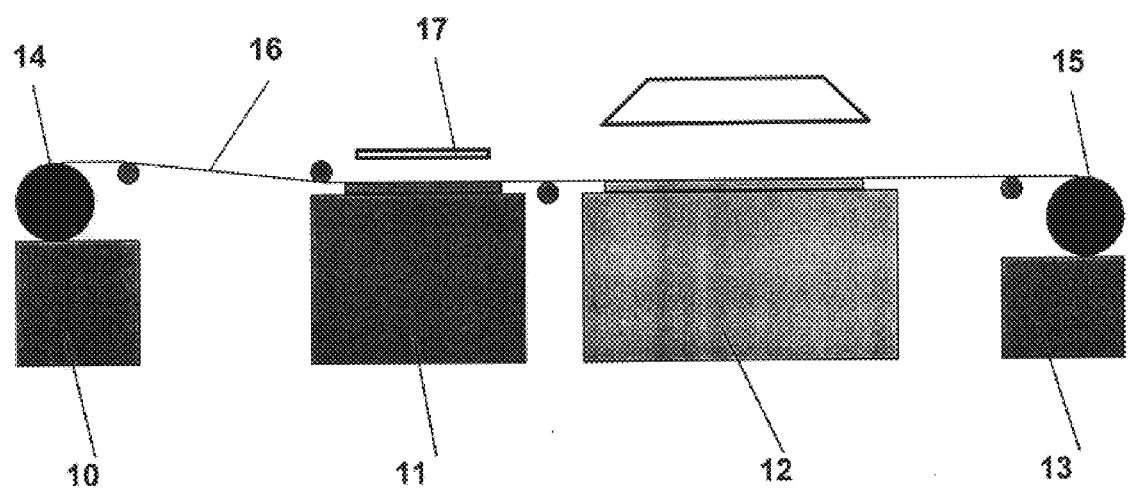
FIG. 4 is a schematic flow chart of a stripe coating line with a screen printing station.

FIG. 4 shows the basic layout of a strip coating line with a screen printing station for implementing the process according to the invention. (10) denotes the unwinding device for the polymer membrane (16) supplied on a roll (14). The polymer membrane is fed through the screen printing station (11) with the printing couple (17) and then through the continuous drier (12), before being wound up on the roll (15) in the winding device (13).

Figure 5:
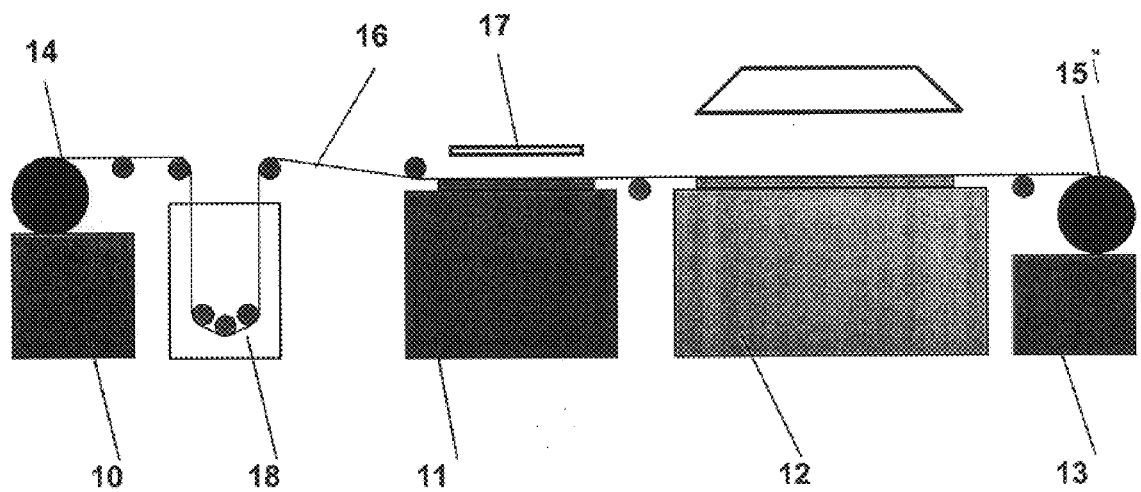
FIG. 5 is a schematic flow chart of a strip coating line from FIG. 4 with integral soaking bath.

To adjust the water content of the polymer membrane, the strip coating line can be extended in accordance with FIG. 5 by adding a soaking bath (18). The necessary soaking period for setting a particular water content can be prolonged with a pre-set strip speed by means of appropriate deflector rolls for the polymer membrane in the soaking bath.

The coating of a polymer membrane with the catalyst electrodes on the strip coating line according to FIG. 5 takes the following form:

The polymer membrane strip supplied in the form of a roll (14) is hung in the unwinding device (10) and fed through the coating line. All polymer electrolyte membranes which are obtainable in strip form can be used. Membranes of tetrafluoroethylene-fluorovinyl ether copolymer with sulfonic acid groups are preferably used. However other, especially fluorine-free, ionomer materials, such as sulfonated polyether ketones or aryl ketones or polybenzimidazoles, may also be used.

The length and width of the rolls can be varied within broad limits. For practical purposes, lengths of up to 100 m with widths of about 0.20 to 1.50 m prove suitable. Examples of membrane materials containing fluorine are NAFION® 115, NAFION® 112, GORE SELECT®, FLEMION®. Membranes reinforced with backing fabric, such as for example NAFION® 450, may also be used.

The membrane is drawn through the soaking bath (18) to adjust its water content, the residence time in the bath and its temperature being sufficient for the membrane to absorb a water content of 2 to 20 wt. %. The pH of the bath depends on the chemical form of the membrane material. Membranes in protonated form ($H^+$ from) are treated in an acid bath (pH 1 to 5); membranes in alkaline form are treated in neutral or alkaline baths. The optimum water contents differ according to the type of membrane and should be determined before carrying out the coating.

After passing through the soaking bath, the liquid adhering to the surface is removed using strippers. In the screen printing station (11), the front of the membrane is first coated with electrode layers in the desired pattern (selectively). During the actual printing operation the polymer membrane is held, printed and then moved on by the repeat distance of the coating pattern. This operation is repeated until the entire polymer membrane is coated.

The printed electrodes are dried by means of the continuous drier (12), a drying temperature of between 60 and 150° C. being selected. Hot-air or infrared driers which gently remove the solvents from the coating are preferably used. The drying time needed is regulated by the speed of the polymer strip.

Further printing operations can follow the drying. For this purpose, the appropriate printing machines should be integrated into the coating lines of FIGS. 4 or 5. Thus, for example, first the anode side and then the cathode side can be coated. However, it is also possible, in order to achieve thick or graduated layers, to coat one side several times in succession.

After passing through the coating line, the printed membrane strip is rolled up with the aid of the strip winder (13) and passed on for further processing (e.g. further coating, cutting, laminating with gas diffusion structures, packaging etc.).

In the case of the coating lines according to FIGS. 4 or 5, the membrane is fed back to the front of the unwinding device (10) after coating and is coated again. To coat the back, the roll is first turned round.

To produce the anode coating, an ink or paste is used which contains an electrocatalyst that is suitable for hydrogen oxidation, for example platinum or other precious metals, supported on a carbon black with a large surface area. To increase the resistance of the catalyst to contamination of the hydrogen with carbon monoxide, other precious metals such as ruthenium or palladium may be used here. Suitable catalysts are described in DE 19721437 and DE 19756880.

For the production of the cathode, an electrocatalyst is used which catalyzes the reduction of oxygen, especially platinum or suitable alloys of platinum with various transition metals. Suitable electrocatalysts for this purpose are described in DE 4426973 Al, DE 19517598 A1 and P 19848032.6 (as yet unpublished German patent application).

For use in fuel cell stacks, the membrane-electrode assemblies (MEAs) produced with the aid of the process described are combined, optionally after reprotonating, with gas diffusion structures on the cathode and anode sides by laying on, sticking on or laminating.

As an alternative to the procedure described, it can also be useful to provide only one side of the polymer membrane with electrode layers by printing. These can be either the cathode or the anode layers. To produce membrane-electrode assemblies from this membrane coated on one side, it is combined, optionally after reprotonating, with gas diffusion structures on the coated side by laying on, sticking on or laminating, and on the uncoated side, with accurate positioning in respect of the printed electrode layers, it is combined with catalyzed gas diffusion electrodes which contain an electrode layer on a gas diffusion structure.

The MEAs produced according to the invention are distinguished by high power density with low precious metal loading. Typical values are 0.5 W/cm$^2$ with a total platinum loading (sum of anode and cathode loading) of 0.4 mg/cm$^2$. This corresponds to a platinum consumption of 0.8 g Pt/kW. This value enables MEAs to be used for mobile and stationary PEMFC applications.

The following examples are intended to illustrate the process according to the invention in more detail.

To produce membrane-electrode assemblies, an ink according to DE 196 11 510 A1 (U.S. Pat. No. 5,861,222) with the following composition was used:

| Ink: | Catalyst 20% Pt on Vulcan XC72 | 15.3 g |
|---|---|---|
| | NAFION Polymer | 5.1 g |
| | Tetrabutylammonium hydroxide | 2.0 g |
| | Li$_2$CO$_3$ | 5.5 g |
| | Glycerol | 127.7 g |
| | Alcohol, water | 44.6 g |

EXAMPLE 1

A 10 meter long and 0.3 meter wide piece of polymer electrolyte film of the NAFION® NE 1035 type was provided in the form of a roll. The water content of the membrane was 2 wt. %. The membrane was in the Na$^+$ form. The membrane was printed with the electrode layers on a strip coating line as shown in FIG. 4. The polymer electrolyte film was fed to the screen printing station by means of the unwinding and transport device. In the screen printing station the film was printed with consecutive electrode layers measuring 14.9 cm×24.7 cm using the ink specified above.

The average speed of the membrane through the coating line was 300 m/h. The individual electrode segments were printed on the membrane at a distance of 6 cm from one another.

To dry the freshly printed electrode layers, after leaving the screen printing station, the membrane was passed continuously through a circulating air drier where the solvent components of the printing ink were removed at 90° C. and the electrode layers were fixed.

Downstream of the continuous drier, the polymer electrolyte film which had been coated on one side was rolled up by means of the winding device. The operation described was repeated several times until the desired loading of 0.2 mg Pt/cm$^2$ was reached.

The roll was then turned round so that the back of the polymer electrolyte film could be coated. The back was coated in such a way that the coated segments on the front and back were positioned accurately opposite one another (see FIG. 3). The back coating was also repeated several times until a loading of 0.2 mg Pt/cm$^2$ was reached.

EXAMPLE 2

Using a membrane of the same type as in Example 1, another coating test was carried out. In contrast to Example 1, the water content of the membrane was adjusted to 20 wt.% prior to each coating. For this purpose, a soaking bath was inserted in the coating line of FIG. 4 upstream of the screen printing station (see FIG. 5). The temperature of the soaking bath was 60° C.

Apart from this difference, the coating was carried out exactly as in Example 1.

EXAMPLE 3

This example was carried out exactly as in Example 2. In contrast to Example 2 a polymer membrane of the NAFION® NE 112 type was used. This is a polymer membrane in the acid H$^+$ form. To coat this membrane an ink was prepared having the composition described above, but omitting the tetrabutylammonium hydroxide. The electrode layers were dried at 70° C.

Testing of the Membrane-electrode Assemblies

One segment was cut out of each of the three coated membranes and reprotonated by treating for one hour in 0.5 M sulfuric acid. A piece of the coated area measuring 9 cm×9 cm was then cut out of each, combined with gas diffusion structures and installed in a polymer electrolyte membrane test cell with an active area of 50 cm$^2$. The cell was tested in hydrogen/air operation under a gas pressure of 3 bar. The cell temperature was 75° C. The gas streams were humidified at 85° C. (anode) and 60° C. (cathode). The gas stoichiometry was 1.5 for hydrogen and 2.0 for air.

The test results are listed in Table 1.

TABLE 1

| Example | Cell voltage at 0.5 A/cm$^2$ | Cell voltage at 0.8 A/cm$^2$ |
|---|---|---|
| 1 | 660 mV | 527 mV |
| 2 | 665 mV | 555 mV |
| 3 | 692 mV | 587 mV |

The above test results show that the coating process described is excellently suited to producing membrane-electrode assemblies on a large scale, inexpensively and with performance data comparable with those of individual manufacture.

Further variations and modifications will be apparent to those skilled in the art from the foregoing and are intended to be encompassed by the claims appended hereto.

German priority application 199 10 773.4 is relied on and incorporated herein by reference.

We claim:

1. A process for applying an electrode layer to a polymer membrane strip in a desired pattern, comprising:

treating a polymer membrane to thereby form a water content of 2 to 20 wt % in said polymer membrane, having a front and back surface, printing on said front and back surface an electrode layer in a desired pattern using an ink comprising an electrocatalyst to thereby form a printed electrode layer on said surface, said printing taking place while maintaining accurate positioning of the patterns of the electrode layers on the front and back in relation to one another, drying said front and back surface having said printed electrode layer at elevated temperature immediately after forming said printed electrode layer.

2. The process as claimed in claim 1 wherein said applying is carried out simultaneously.

3. The process as claimed in claim 1 wherein said applying is carried out sequentially.

4. A process as claimed in claim 1, wherein said pattern is printed by continuous screen, offset, gravure or pad printing.

5. A process as claimed in claim 1, wherein the polymer electrolyte membrane is in a thermally stable form which is obtainable by exchanging protons for monovalent, positively charged ions.

6. A process as claimed in claim 1, wherein the polymer electrolyte membrane is in the acid form and is converted to a thermally stable form prior to forming the pattern by printing by exchanging protons in said membrane for monovalent, positively charged ions.

7. A process as claimed in claim 1, wherein the drying of the printed electrode layers takes place at temperatures of 60 to 150° C.

8. The process according to claim 1 wherein the polymer electrode membrane is a proton conducting polymer.

9. The process according to claim 8 wherein the polymer is a member selected from the group consisting of tetrafluoroethylene fluorovinyl ether copolymers having sulfuric acid groups.

10. The process according to claim 8 wherein the polymer is a fluorine free sulfonated polyether ketone, aryl ketone or polybenzimidazoles.

11. A process for the production of a membrane-electrode assembly, wherein the polymer electrolyte membrane printed with at least one electrode layer as claimed in claim 1 is combined with a gas diffusion structure, optionally after reprotonating, by laying on, adhering on or laminating to said at least one electrode layer.

12. A membrane-electrode assembly for polymer electrolyte membrane fuel cells, wherein the membrane coated on both sides with the electrode layers is produced as claimed in claim 1.

13. A fuel cell containing the membrane-electrode assembly of claim 12.

* * * * *